US007353121B2

(12) United States Patent
Baraty

(10) Patent No.: US 7,353,121 B2
(45) Date of Patent: Apr. 1, 2008

(54) METHODS, APPARATUS, MEDIA AND SIGNALS FOR FACILITATING REAL-TIME MANAGEMENT OF A UTILITY SUPPLY

(75) Inventor: Mohammad Reza Baraty, Burnaby (CA)

(73) Assignee: Smart Disaster Response Technologies, Inc., Irvine, CA (US)

( * ) Notice: Subject to any disclaimer, the term of this patent is extended or adjusted under 35 U.S.C. 154(b) by 0 days.

(21) Appl. No.: 11/413,400

(22) Filed: Apr. 28, 2006

(65) Prior Publication Data

US 2007/0255612 A1 Nov. 1, 2007

(51) Int. Cl.
*G06F 19/00* (2006.01)
*G06F 17/00* (2006.01)

(52) U.S. Cl. .......................... 702/61; 702/62; 702/187; 705/412

(58) Field of Classification Search .................. 702/61
See application file for complete search history.

(56) References Cited

U.S. PATENT DOCUMENTS 3,714,456 A 1/1973 Krohmer et al.
4,414,994 A 11/1983 Hogan
4,620,283 A 10/1986 Butt et al.
4,833,461 A 5/1989 Yeager
4,841,287 A 6/1989 Flig et al.
5,240,024 A 8/1993 Moore et al.
5,267,587 A 12/1993 Brown
5,489,889 A 2/1996 Kambouris et al.
5,568,825 A 10/1996 Faulk
5,572,438 A 11/1996 Ehlers et al.
5,601,108 A 2/1997 Perry
5,689,233 A 11/1997 Kurisu et al.
6,181,985 B1 1/2001 O'Donnell et al.

(Continued)

FOREIGN PATENT DOCUMENTS

CA 2163696 5/1996

(Continued)

OTHER PUBLICATIONS

Li Chunlin et al., "Pricing and resource allocation in computational grid with utility functions", Apr. 4-6, 2005, IEEE, International Information Technology: Coding and Computing, 2005, ITCC 2005, vol. 2, pp. 175-180.*

*Primary Examiner*—Hal D Wachsman
(74) *Attorney, Agent, or Firm*—Knobbe Martens Olson & Bear LLP

(57) ABSTRACT

Methods, apparatus, computer readable data and signals for facilitating the supply of a utility provided to a consumer site by a plurality of providers and/or retailers and differentiation are disclosed. In one embodiment, each provider produces a representation of a utility and the provider that reveals: specification of the provider, quality and quantity standards, live real time price, rules of usage, and reliability of the provider and grade of the product. In one embodiment, each consumer inputs consumer preferences and parameters related to selecting utility providers. In one embodiment, rules for regulating usage of a utility are provided by regulatory authorities. In one embodiment, real time capacity information related to the distribution and transmission of a utility is provided by transmission authorities. In one embodiment, all the consumer preference information and rule information and capacity information is received and processed in real time to automatically select a preferred utility provider.

24 Claims, 6 Drawing Sheets

U.S. PATENT DOCUMENTS

| | | | | |
|---|---|---|---|---|
| 6,216,956 | B1 | 4/2001 | Ehlers et al. | |
| 6,266,579 | B1 | 7/2001 | Baraty | |
| 6,323,774 | B1 | 11/2001 | Mitchell | |
| 6,380,949 | B2 | 4/2002 | Thomas et al. | |
| 6,519,509 | B1 | 2/2003 | Nierlich et al. | |
| 6,842,706 | B1 | 1/2005 | Baraty | |
| 2004/0015433 | A1 * | 1/2004 | Johnson et al. | 705/37 |
| 2004/0024483 | A1 | 2/2004 | Holcombe | |
| 2005/0105703 | A1 | 5/2005 | Baraty | |
| 2005/0125243 | A1 * | 6/2005 | Villalobos | 705/1 |
| 2006/0129497 | A1 | 6/2006 | Baraty | |
| 2006/0129498 | A1 | 6/2006 | Baraty | |
| 2006/0259199 | A1 * | 11/2006 | Gjerde et al. | 700/284 |

FOREIGN PATENT DOCUMENTS

| | | | |
|---|---|---|---|
| EP | 0694859 | A2 | 1/1996 |
| EP | 0714018 | A2 | 5/1996 |
| WO | WO 93/20544 | | 10/1993 |

* cited by examiner

| Provider-code | Utility Type | Producer | Retailer | Nuclear | Hydro | Gas | Blackouts | Available Quantity | consumption | Price | Y | Z |
|---|---|---|---|---|---|---|---|---|---|---|---|---|
| 100001<br>100010<br>100011<br>.......... | Power<br>100 | 01 | 10 | 000 | 010 | 100 | No 00<br>Yes 01<br>Med 11 | 101010 | Comp. 00<br>Kitch. 01<br>TV 11 | 1000<br>1001<br>1101<br>....... | | |
| 110111<br>110100<br>110001<br>............ | Water<br>110 | 01 | 10 | Spring<br>000 | River<br>010 | Well<br>100 | Disc.<br>No 00<br>Yes 01<br>Some 11 | 101000 | consumption<br>Industry 00<br>Home 10<br>Drinking 01 | 1100<br>0010<br>1110<br>....... | .. | .. |
| 010011<br>010001<br>010010<br>........... | Gas<br>010 | 01 | 10 | Fossil<br>000 | Bio<br>010 | Ocean<br>100 | Disc.<br>NO 00<br>Yes 01<br>Some 11 | 111100 | consumption<br>Industry 00<br>Home 10<br>Car 01<br>F. Place 11 | 1010<br>0101<br>0000<br>...... | .. | .. |
| 111011<br>111110<br>111100<br>............ | Phone<br>111 | 01 | 10 | Wired<br>000 | Wireless<br>010 | I Net<br>100 | Reception<br>Good 00<br>Average01<br>Poor 10 | Band width<br>Available<br>1000110 | consumption<br>Internet 00<br>Video 10<br>Audio 11 | 1000<br>0001<br>1100 | .. | .. |
| ............ | Swage | | | | | | | | | | | |
| ............ | Cable | | | | | | | | | | | |
| ............. | Internet | | | | | | | | | | | |
| ............. | .......... | | | | | | | | | | | |

FIG 2

Regulation charts in real time

| | Power | Water | Gas | Phone | Cable TV | Internet | Sewage |
|---|---|---|---|---|---|---|---|
| Restriction 1 | Pool heating off | Lawn watering off | Driveway heat off | Online game off | Not for kids | Child porn off | Eco hazard off |
| Restriction 2 | Neon signs off | S pool supply off | Patio heater off | Duration max 2 m | Voice level low | Gambling off | Chemicals limit x, y, z |
| Restriction 3 | ...................... | .................... | ................... | ...................... | .................. | ................ | .............. |
| | | | | | | | |

FIG 3

Consumer choice and preferences

| | Power | Water | Heating Gas | Phone | Cable TV | Internet | Sewage |
|---|---|---|---|---|---|---|---|
| Priority 1 | Green power | Spring water | Bio- source | LD price | Movie CH | No downtime | Eco -friendly |
| Priority 2 | Lowest price | No chlorine | Fossil | Voice quality | No violence | Bundle pack | Low price |
| Priority 3 | nuclear | river | Ocean | X co | Local co | XGB download | maintenance |
| Priority 4 | Fossil | Low price | Low price | Extra feature | Low price | Low price | Treatment |
| .......... | ............ | ............ | ............ | .......... | ........... | ........... | ......... |

FIG 4

| | Power 100 | Water 110 | Gas 010 | Phone 111 | Cable TV 011 | Sewage 001 | .......... |
|---|---|---|---|---|---|---|---|
| First choice | 100010 | 110000 | 010010 | 1111100 | 011001 | 001001 | ......... |
| 2nd choice | 1001101 | 110100 | 010000 | 111000 | 011010 | 001010 | .......... |
| 3rd choice | 100000 | 110010 | 010100 | 111111 | 011100 | 001100 | ......... |
| 4th choice | 100100 | 1101110 | 0100000 | 111011 | 011000 | 001000 | .......... |
| .......... | ......... | ......... | ............. | ......... | ......... | .......... | ......... |

FIG 5

METHODS, APPARATUS, MEDIA AND SIGNALS FOR FACILITATING REAL-TIME MANAGEMENT OF A UTILITY SUPPLY

BACKGROUND OF THE INVENTION

1. Field of the Invention

This application relates generally to utilities, more particularly selecting a utility provider and utility user, automatically and on real-time basis.

2. Description of the Related Art

There is an increased interest in providing a competitive marketplace for utility providers. Further, it is well known that certain utilities are governed by government regulations. Moreover, it is well known that certain utilities, such as electricity, are supplied on a common grid.

SUMMARY OF THE INVENTION

In one embodiment, there is provided a method of:

a- Producing and recording information data related to representation of a specific utility and the provider of that utility, at the provider site, b- Transmitting the data to consumer sites and/or a Control & Clearing House, and distribution system in real-time, via any available methods, and/or networks of telecommunication systems, c- Receiving, verifying, processing, recording and storing of the data at a controller and/or a computer in the consumer site and/or Control & Clearing House, and/or the distribution system, in real time, via any available methods, and/or networks of telecommunication systems.

The features of this embodiment are advantageous because the features of this embodiment would promote healthy competition for price by allowing small scale producers to sell directly to consumers, and create incentives for the private sector in finding alternative sources of supply and most importantly educate the consumers towards optimum social economically correct consumptions.

One embodiment relates to methods, apparatus, media and signals for performing real-time identification, differentiation, recording, storing and communication of utility data related to the supply of one or more types of utilities each from a variety of utility suppliers and/or retailers. In one embodiment, a retailer is a utility supplier (a reseller, or broker) that resells a utility after buying in bulk a utility supply from a supplier. In one embodiment, the utility data is stored at an intermediary authority, and/or at a consumer site or specific subscriber location. One embodiment relates to the allocation of scarce energy and/or water from a specific supplier and/or retailer where there are many available suppliers and/or retailers of the same kind of utility. One embodiment is configured to provide the consumer and/or subscriber on a real-time basis price information related to the provided utility, and a time stamped usage regulations. In one embodiment, the time stamped usage regulations are restrictions or rules on the use or consumption of a utility by a consumer.

In one embodiment, the representation of specific utility and the provider may comprise: specifications of the provider, type and specification and available quantity of the utility, real-time price(s) (plus or minus a percentage of spot price, for example), government regulation information and/or limitations of usage, and verification codes, for example.

In one embodiment, the utility data comprises information related to the utility provider, utility availability, utility allocation limits, time of use price, and specifications of a utility service provided by multiple producers and/or retailers to a specific consumer and/or subscriber in real-time, and automatically billing the consumer and clearing accounts for all parties involved like: supplier, transmission facilitator, and revenue agency, etc. accordingly.

In one embodiment, a Control & Clearing House is an intermediary entity that manages, controls, oversees and foresees the pooling of utilities, monitor quality and quantity standards, enforce real-time regulations, and process billing and payment for each utility provided by retailers or suppliers and distributors and governments. In one embodiment, the Control & Clearing House is linked to a Consumer Site Usage and Management Computer System. In one embodiment, the Control & Clearing House may have different departments for controlling usage or accounts clearing features. In one embodiment, a utility broker or a utility retailer purchases a supply of utility in bulk and later sells the utility to the individual consumers through the Control & Clearing House.

In one embodiment, the Consumer Site Usage and Management Computer System is a programmable device located at the consumer site. In one embodiment, the Consumer Site Usage and Management Computer System comprises the features and advantages of programmable devices described in other patents. For example, U.S. Pat. No. 6,842,706 B1 discloses methods, apparatus, computer readable media, and signals for managing utility usage. Generally, each involves receiving a representation of a utility service usage at a load, receiving and storing a usage range representation, and producing a control signal for use by a utility service interrupter, when the usage is outside of the usage range representation. The control signal is operable to cause the utility service interrupter to interrupt a supply of the utility service to the load. Each also involves receiving a control signal indicating that a usage of the utility service at the load is outside of a usage range representation, and interrupting the supply of the utility service to the load in response to the control signal. In one embodiment, a consumer site has a programmable device that is configured to control a utility consuming device. Additionally, U.S. Pat. No. 6,842,706 B1 discloses systems and methods for monitoring subscriber usage of a utility service and for billing a subscriber for utility service usage, which are all features included in one embodiment of the Consumer Site Usage and Management Computer System.

In one embodiment, the Consumer Site Usage and Management Computer System comprises the features disclosed in U.S. Pat. No. 6,842,706 B1 for producing and storing a plurality of measurements of usage of the utility service, measuring usage of a plurality of utility services, obtaining rate information for at least some of the utility services, applying the rate information to the at least some of the utility services to produce at least some billing values for the at least some utility services, and causing at least some bills to be produced, bearing the at least some billing values, and producing a billing signal in response to a request for the bill to be produced. U.S. Pat. No. 6,842,706 B1, which is to be considered a part of this specification, and is hereby expressly incorporated by reference herein in its entirety.

In one embodiment, the Consumer Site Usage and Management Computer System is a programmable device connected to a communications network and to a utility consuming device such that the Consumer Site Usage and Management Computer System is configured to control the utility consuming device and/or the amount of utility provided or consumed by the utility consuming device. In one embodiment, the Consumer Site Usage and Management Computer System comprises a network interface to receive and send a data stream. In one embodiment, the Consumer Site Usage and Management Computer System comprises a storage medium for storing data. In one embodiment, the Consumer Site Usage and Management Computer System comprises a processor configured to process a data stream in real-time to determine and select a preferred utility provider at given time.

In one embodiment, the Consumer Site Usage and Control System is a programmable device or computer system that stores and records the consumer data specifically relating to utility usage, utility usage billing and consumer choice and preference information. In one embodiment, the Consumer Site Usage and Control System reduces the need to centrally store such consumer data thereby reducing the high volume of data created and stored at a Control & Clearing House and/or at the Utility Site.

In one embodiment, a utility includes but is not limited to: electricity, gas, drinking or industrial or reclaimed or irrigation water, cold and/or hot water, telephone, cable TV and/or satellite TV, internet access, waste water or sewage drainage, data flow, and flow of chemicals that may enter or exit from a consumer site by means of conductor or pipe, RF (radio frequency), MW (Micro Wave), light and other carriers, in common public or private grids or networks. In one embodiment, a utility includes services related to the processing and/or removal and/or drainage of waste water or chemical discharges.

In one embodiment, the method includes transmitting and/or receiving a data stream from and/or between a server computer and a Consumer Site Usage and Management Computer System by a carrier wave, wire, RF, IR (infrared), microwave, laser, internet, PSTN, or via relaying satellite/s or any other means for transmitting a data stream. In one embodiment the server computer is located at a utility provider site. In one embodiment, the server computer is located at Control & Clearing House. In one embodiment, the server computer is located at a regulatory authority. In one embodiment, the server computer is located at the distribution and transmission site. In one embodiment, the regulatory authority is a government entity or a regulatory entity or an entity that establishes rules for consuming a utility. In one embodiment, the regulatory authority produces rule data or causes a third party entity to produce rule data related to the regulation of the use or consumption of a utility by a consumer. In one embodiment, the distribution and transmission entity is an entity that distributes and/or transmits a utility over pipelines or wires, waves or other means.

In one embodiment, the method includes transmitting and/or receiving a data stream in a programmable device/computer by a carrier wave via wire, RF, IR, microwave, laser, internet, PSTN and any other contemporary methods directly or via relaying satellite/s, and/or by direct interface input at the consumer site and/or a Control & Clearing House, for example In one embodiment, the method includes recognizing the utility type and the utility provider in the Consumer Site Usage and Management Computer System and/or Control & Clearing House computer from a machine readable code by comparing the code to a stored lookup table or information inputted by consumer through an input device. In one embodiment, the utility type and utility provider information transmitted to the Consumer Site Usage and Management Computer System and/or the Control & Clearing House computer as a text file.

In one embodiment, utility provider data is derived from differentiating between the different suppliers/retailers of same kind of utility by extracting and processing the various specification and information from the data stream at the Consumer Site Usage and Management Computer System and/or Control & Clearing House. In one embodiment, the utility provider is recorded and stored in the Consumer Site Usage and Management Computer System. In one embodiment, utility provider data is recorded and stored in the Control & Clearing House computer. In one embodiment, utility provider data includes but is not limited to information and data related to the utility provider and the utility offered by the provider. In one embodiment, the utility provider data includes but is not limited to price of the utility, quality of utility, billing information related to the provider.

In one embodiment, a utility provider records and stores within a utility provider server the specification and information related to the utility that the provider is offering. In one embodiment, the method includes recording and storing within a utility provider server the specification and information related to the utility that the provider is offering.

In one embodiment, the method includes comparing utility provider data with consumer preference data. In one embodiment, consumer preference data is known as consumer data. In one embodiment, consumer preference data is a representation of consumer preferences and priorities, and is recorded and stored in the Consumer Site Usage and Management Computer System. In one embodiment, a selection of utility provider is based on consumer preference data.

In one embodiment, the method includes comparing utility provider data with values inputted by a consumer through an interface device to select a preferred provider of a particular utility.

In one embodiment, the method includes comparing utility provider data received from a particular utility provider with other utility provider data transmitted from the Control & Clearing House to select a preferred provider of a particular utility. In one embodiment, the utility provider data received from the Control & Clearing House is recorded and stored in the Consumer Site Usage and Management Computer System to allow the consumer to command, in real-time, the Control & Clearing House to provide the consumer with a particular utility from a preferred utility provider at a particular time. In one embodiment, the utility provider data received from a utility provider is recorded and stored in the Consumer Site Usage and Management Computer System to allow the consumer to command, in real-time, the Control & Clearing House to provide the consumer with a utility from the utility provider at a particular time.

In one embodiment, consumer preference data comprises consumer preferences related to selecting a provider, and include but are not limited to: lowest price, green production methods, location of the producer, reliability, fewer blackouts or disruptions, political or social affiliation or orientation, type of the resources used, price, billing and payment flexibility of the provider.

In one embodiment, the method includes comparing the consumer preference data to regulatory data received from a utility usage curtailment authority or other utility regulatory entity or entity that creates by-laws or ordinances. In one embodiment, the regulatory data is received by the Consumer Site Usage and Management Computer System and/or Control & Clearing House, and defines the limits of utility consumption and/or allowable providers, suppliers and/or retailers. In one embodiment, regulatory data comprises rules or regulations prohibiting the use of industrial grade energy by kitchen appliances. In one embodiment, the regulatory data comprises rules or regulations prohibiting the use of drinking water for watering lawns or washing cars.

In one embodiment, the method includes comparing utility provider data from various providers and recording and storing the data in the Consumer Site Usage and Management Computer System and/or Control & Clearing House systems. In one embodiment, the utility provider data is stored in a database in the Consumer Site Usage and Management Computer System. In one embodiment, the Consumer Site Usage and Management Computer System ranks the utility providers based on the corresponding utility provider data stored within the database. In one embodiment, the Consumer Site Usage and Management Computer System derives utility provider comparison charts that comprise data related to a plurality of utility providers and corresponding data related to the utility that the provider is offering.

In one embodiment, the plurality of utility providers comprises at least a first provider and a second provider that supplies a consumer with a particular utility. In one embodiment, a first utility data relates to the first provider and comprises information related to the utility that is provided by the provider and information related to the utility provider. In one embodiment, a second utility data relates to the second provider.

In one embodiment, the method includes receiving consumer preference information and storing the consumer preference information into a consumer preference database located in the Consumer Site Usage and Control System. In one embodiment, the method includes receiving regulatory data into a regulatory data database located in the Consumer Site Usage and Control System. In one embodiment, the consumer reference information and the regulatory data is received and recorded in at least one database located in the Control & Clearing House computers. In one embodiment, the method includes creating charts of preferences as inputted by a consumer, and/or directed by utility regulators in Consumer Site Usage and Management Computer System and/or Control & Clearing House computers.

In one embodiment, the method includes processing the utility provider data and the consumer preference data and the regulatory data to select a preferred utility provider. In one embodiment, the processing is performed by the Consumer Site Usage and Management Computer System and/or the Control & Clearing House computers. In one embodiment, the method includes utilizing and comparing the utility provider comparison charts with the charts of preferences to select a preferred utility provider. In one embodiment, the comparison is performed by the Consumer Site Usage and Management Computer System and/or the Control & Clearing House computers.

In one embodiment, the method includes receiving, in real-time, from a utility provider different price codes for different usages or loads at a particular time. In one embodiment, the different price codes are received in the Consumer Site Usage and Control System and/or in the Control & Clearing House computers.

In one embodiment, the method includes receiving, in real-time, different consumer choice data for different usages or loads at a particular time. In one embodiment, the consumer choice data is received in the Consumer Site Usage and Control System and/or in the Control & Clearing House computers and/or in the utility provider server.

In one embodiment, the method includes receiving, in real-time, from a utility provider different utility specifications and information related to different usages or loads at a particular time. In one embodiment, the different utility specifications and information are received in the Consumer Site Usage and Control System and/or in the Control & Clearing House computers.

In one embodiment, there is provided a computer readable medium for providing instruction codes executable by a programmable device, for directing the programmable device to receive a representation of a utility and the utility provider at consumer site and/or Control & Clearing House. In one embodiment, the programmable device receives and stores usage rules and limitations from a utility regulating entity and/or distribution system. In one embodiment, the programmable device compares the representation of a utility and the provider, and the usages rules and limitations with a utility usage by a consumer to determine whether the utility usage conforms to the rules and limitations. In one embodiment, the programmable device produces a signal indicating conformed usage, and a signal to be used by a billing and usage control system. In one embodiment, the programmable device is the Consumer Site Usage and Management Computer System.

In one embodiment, there is provided a computer data signal embodied in a carrier. The computer data signal includes code segments for directing a plurality of programmable devices to transmit a representation of a utility and the provider, rules and regulations related to utility usage, and/or grid capacity information, consumer choices and preferences information, and a signal to be used by a billing and usage control system.

In one embodiment, there is provided an apparatus for communicating, recognizing, differentiating, recording and storing a representation of a utility and the utility provider at the consumer site and/or Control & Clearing House, communicating with regulators in order to receive current and time stamped regulation of usage, and/or communicating with distribution system to receive grid capacity, and receiving consumer input of preferred provider preferences.

In one embodiment, the apparatus includes a programmable device, a processor circuit, a communication device, and be linked to a utility usage management system. In one embodiment, the programmable devise is the Consumer Site Usage and Management Computer System.

In one embodiment, the communication device is operable to communicate with a plurality of utilities providers, plurality of utility regulatory entities, plurality of grids capacity entities, a plurality of distributors, a plurality of consumer sites, and plurality of billing and payment entities.

In one embodiment, there is a method of supplying a Consumer Site Usage and Management Computer System with a utility provided by plurality of providers who have a real-time access, and providing real time representation of the provider and the utility, to a Consumer Site Usage and Management Computer System, and to an intermediary authority, the method comprising: a) producing a representation of a utility and the provider at provider site recording and storing the representation at the site, then transmitting the representation from the provider site; b) receiving, recording, and storing representation of rule and regulation of consumptions from the authorities, in the Consumer Site Usage and Management Computer System, and Control & Clearing House computer; c) receiving, recording, and storing representation of the utility and the provider at Consumer Site Usage and Management Computer System and Control & Clearing House, and distribution and transmission system computer; d) receiving, recording and storing consumer choice parameter and preferred provider's specification at the Consumer Site Usage and Management Computer System and/or Control & Clearing House computer; e) processing received information b, c, and d, at the Consumer Site Usage and Management Computer System and finding the most suitable provider among many for the given time for a utility consumed.

One embodiment relates to the method wherein at least one of the first or second providers is a producer and supplier of a utility. One embodiment relates to the method wherein at least one of the first and second providers is a retail supplier of a utility, wherein a retailer is a utility supplier that resells a utility. One embodiment relates to the method wherein receiving/transmitting comprises a message in a format of code executable by a programmable device from/by a communication system. One embodiment relates to the method wherein receiving comprises extracting the code from a network protocol. One embodiment relates to the method wherein receiving, recording and storing comprises receiving, recording and storing plurality of: b) the rule and regulation, c) the representation of the utility and the provider and/or grid capacity d) the consumer choice parameter.

One embodiment comprises the method step of producing at the provider site representations of a plurality of utilities and/or group of providers. One embodiment relates to the method and further comprises a plurality of Control & Clearing Houses with multiple departments for various activities. One embodiment relates to the method and further comprises a plurality of consumer sites usage management systems. One embodiment relates to the method and further comprises a plurality of consumer choice parameters. One embodiment relates to the method and further comprises a plurality of transmission and distribution systems. One embodiment relates to the method and further comprises a group of consumers. One embodiment relates to the method wherein the processing comprises comparing received data with preset data and deriving a conclusion for most suitable provider. One embodiment relates to the method wherein processing comprises comparing plurality of received, and existing data and deriving conclusion for most suitable provider.

One embodiment relates to the method and further comprises providing processed data of utility provider and its real time price to be used for billing in the consumer site's billing system as described in U.S. application Ser. No. 11/347,969, for example, or any other billing systems. One embodiment relates to the method and further comprises transmitting processed data of utility representation and the provider to a display or annunciation device. One embodiment relates to the method wherein entering representation of a utility and the provider into the control& clearing house computer is directly from the consumer site by an interface device or phone. One embodiment relates to the method wherein entering consumer choice parameters into the consumer site usage management system is directly from the site by an interface device. One embodiment relates to the method and comprises an interface user apparatus, for example, card reader, keyboard, PDA (personal digital assistant), voice recognition input device, telephone, and preprogrammed keys etc.

One embodiment relates to the method wherein representation of utility may include different prices for different usages or loads simultaneously. One embodiment relates to the method wherein consumer choice may include different choices for different usages or loads simultaneously. One embodiment relates to the method wherein different usage codes are initiated by the load itself or the consumer. One embodiment relates to the method wherein processing includes calculating fees to be paid to provider, and distribution and transmission system, and revenue agencies as a factor of consumption and real time price simultaneously, and billing the consumer accordingly. One embodiment relates to the method and further comprises using the usage management apparatus on consumer site.

One embodiment relates to an apparatus for facilitating consumer usage of a utility from a plurality of providers, apparatus comprising: a) a programmable device at provider site to generate representation of utility and the provider data signals live in real time; b) a programmable device at control and clearing house to receive and process data from provider, distribution, regulator, and consumer; c) a programmable device at consumer site to receive and process consumer choice parameters, regulations, and provider and utility representations and process and derive comparisons to find most suitable supplier of time of use, and report the results to Control & Clearing House; d) a programmable device at distribution and transmission system side to receive utility and provider representation supplying to the grid, and communicate grid or network capacities to the regulators, consumer usage management system and control and clearing house; e) a communication device operable to receive and send the data among the a), b), c), and d) data storage devices operable to record and store data produced, and located at each of the above devices a), b), c), and d).

BRIEF DESCRIPTION OF THE DRAWINGS

FIG. 2 is a tabular representation of a utility and a provider that is transmitted between the provider and/or Control & Clearing House and/or the Consumer Site Usage and Management Computer System.

FIG. 3 is a tabular representation of rules and regulations that govern utility consumption by the consumer on a real-time basis. In one embodiment, the representation is transmitted from utility regulating authorities to the Control & Clearing House and/or to the Consumer Site Usage and Management Computer System.

FIG. 4 is a tabular representation of consumer choice and preferences.

FIG. 5 is a tabular representation of utility providers stored in a Consumer Site Usage and Management Computer System in real time. In one embodiment, the utility providers are ranked.

DETAILED DESCRIPTION OF THE PREFERRED EMBODIMENT

Figure 1:
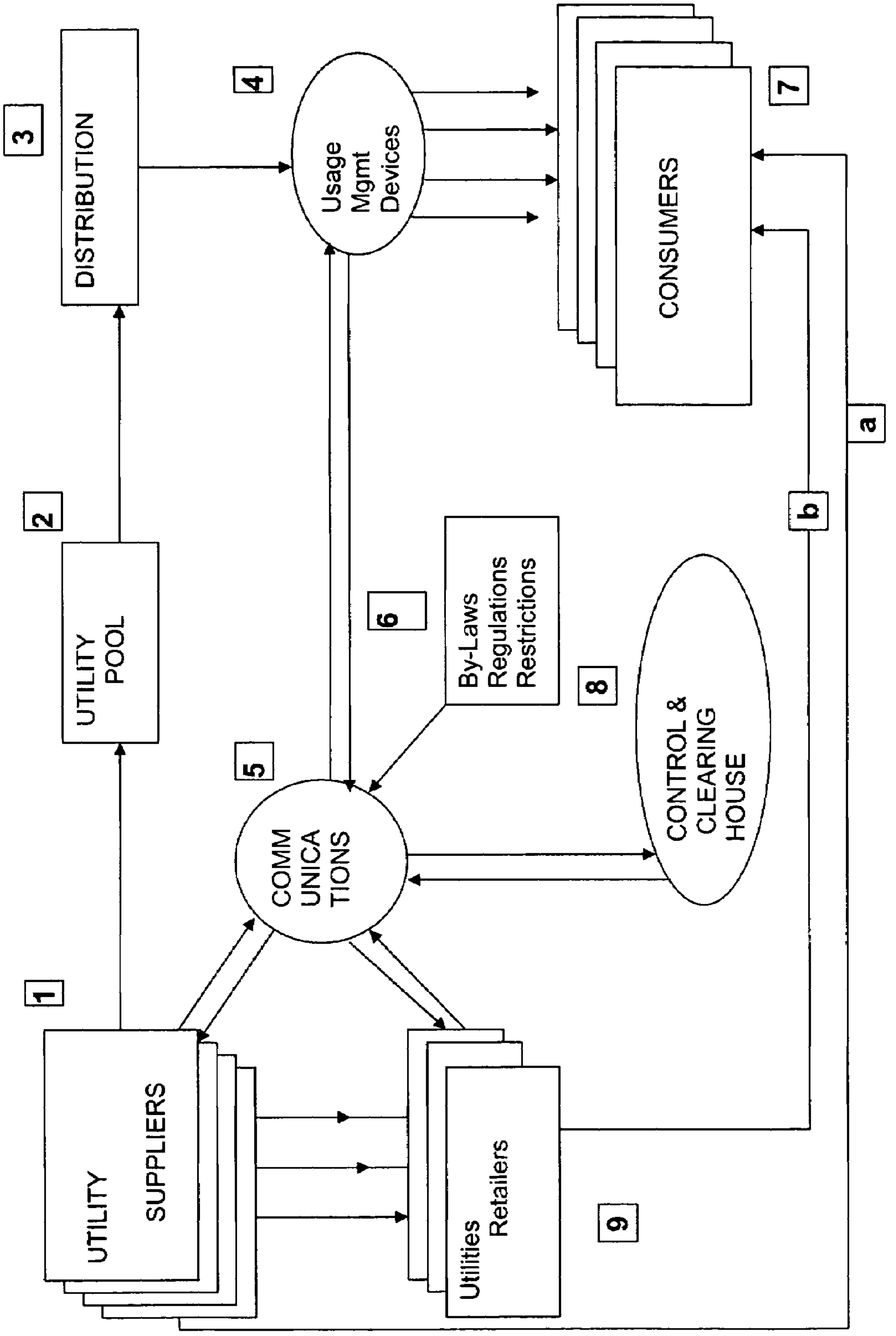
FIG. 1 is a schematic diagram of a system for facilitating the consumption of a utility provided to a consumer site from a variety of suppliers and/or retailers. In one embodiment, the system oversees the whole process, monitors the utility supply, bills the consumer, and clears the accounts on a real time basis by interacting with the Control & Clearing House.

Referring to FIG. 1, in one embodiment, the system includes: a plurality of suppliers 1 of a utility, and a plurality of retailers 9 of the same utility. In one embodiment, the suppliers and the retailers are the providers of utility services. In one embodiment, the retailers are companies or individuals or entities that buy the utility to be supplied at a specific date and time at a discounted wholesale price from the suppliers, and the retailers may sell the utility to consumers at rates higher or lower than the spot price at another time. In one embodiment, the utility pool 2 is the location where all supplies of a particular type of utility are combined or added together, such that participant suppliers can put their utility products from any location on the grid. In one embodiment, even small producers who have difficulty in competing in regulated markets and because the small producers have difficulty handling the metering and billing functions by themselves can benefit from the aforesaid features. In one embodiment, the utility products are transmitted and distributed on a distribution and transmission system 3 (for waves and signals distributed over a wire or wireless networks) to the consumer sites, then utility usage management system 4, an automatic system that can make measurements and flow adjustments, and process data. In one embodiment, the utility usage management system 4 forms part of or is the Consumer Site Usage and Management Computer System as described herein. In one embodiment, the communication system 5 facilitates all communications between the providers 1, the suppliers 9, the usage management system 4 at consumer sites, the Control & Clearing House 8, the distribution and transmission system 3, regulators 6, and the billing and clearing house 8, the regulation and by-law authority 6, which dictates utility usage rules to the usage management system 4 and the Control & Clearing House 8. In one embodiment, the communication system 5 also facilitates all communications between the consumers 7 and the suppliers 1 and the retailers 9. In one embodiment, the suppliers 1 and retailers 9 directly communicate with a consumer 7 and the usage management system 4 via media connections or links a and b.

In one embodiment, the distribution and transmission 3 charges each consumer a levy or fee that is proportional to consumption of each utility as a "delivery charge" and paid to the entity that operates and maintains and expands the grid or the network.

In one embodiment, regulators 6 (for example, a congress, a city government, or district authority, etc.) impose consumption limits to create a utility reserve in the pool to prevent disconnections, blackouts, or bandwidth congestions. In one embodiment, a rule specifies that at the time of large scale disaster, house to house phone calls are to be limited to two minutes at a time for example. In one embodiment, a rule specifies that lawn water sprinklers are to be limited to one hour of use between 6-10 pm when water reserves are low for example. In one embodiment, a rule specifies that neon signs or swimming pool heaters are to be turned off during the day if power reserves are low.

In one embodiment, the Control & Clearing Houses 8 controls the process of managing utility flow and/or selecting a preferred utility provider. In one embodiment, the Control & Clearing House 8 connects to the consumer site 7, and also connects to the suppliers 1 and retailers 9. In one embodiment, the Control & Clearing House 8 creates a price index or comparison chart to provide to consumers. In one embodiment, the Control & Clearing House 8 connects to utility regulating authorities 6 and to distributors 3. In one embodiment, the Control & Clearing House 8 connect to the consumer 7 via phone, media, or direct contact with consumer to promote voluntary conservation.

In one embodiment, the utility usage management system 4 controls the process of managing utility flow and/or selecting a preferred utility provider. In one embodiment, the utility usage management system 4 measures utility usages in real time, and is configured to disconnect, reconnect and adjust the utility consumption at the consumer site 7. In one embodiment, the utility usage management system 4 reports deficiency of the appliances and machinery to the consumer 7 and the Control & Clearing House 8. In one embodiment, the utility usage management system 4 prints or displays a derived bill for all types of utilities consumed at a consumer site 7. In one embodiment, the utility usage management system 4 produces a bill by tallying each segment of real time priced consumption and the system is configured to pay the bill on behalf of the consumer 7. In one embodiment, the utility usage management system 4 chooses, in real-time, a preferred utility supplier at any point in time for a consumer site 7. In one embodiment, the utility usage management system 4 produces data for payments allotted to each provider, distribution and transmission authority, and revenue agency during the consumption period and sends the data to the Control & Clearing House 8 which clears the accounts with all participant suppliers 1 and retailers 9.

In one embodiment, the suppliers 1 are separate from retailers 9. In one embodiment, the suppliers 1 physically produce utility product. In one embodiment, the suppliers 1 include but are not limited to owners of underground water reservoirs who pump and refine and put their products in municipal pipes and reservoirs, power plants and wind and solar power generators, gas refineries, sewage treatment plants, phone and cable companies etc. who pool their product in common grids or networks of supply. In one embodiment, the retailers 9 generally do not have infrastructure to produce utilities or generate carrier waves or process waste but they buy these products and services from the producers at wholesale or future options price, and by advertising or contacting consumers sell their products on a + or − percentage of spot price. An advantage of the embodiments described herein is a consumer site 7 is capable of contracting with multiple suppliers 1 and/or retailers 9 simultaneously over a period of time as oppose to contracting with only one supplier or retailer over a period of time. Another advantage of the embodiments described herein is that suppliers 1 are able to sell their services directly to consumer and by pass the retailers 9.

In one embodiment, the utility pool 2 is the location where all utility supplies converge after having met certain synchronization and other standards. In one embodiment, the utility pool 2 is the location where utility supplies are aggregated and sent to reservoirs, grids, and/or networks. In one embodiment, small utility producers are able to supply or send their utility supplies to the utility pool 2 thereby providing the small producers a chance to profit fairly from their operations and search for alternative sources of supply and/or consumers for their supply.

In one embodiment, the communication system 5 manages the data and signals transmission between all other entities in FIG. 1. In one embodiment, all information and related produced instruction and information codes, which are executable by a programmable device, are sent between the communication system 5 and other entities. In one embodiment, the communication 5 is capable of communicating on any available method of communication. In one embodiment, the communication system 5 is configured to communicate on, but is not limited to, a PTSN, the internet, RF, IR (infrared), laser, WIFI, WAN, LAN. In one embodiment, the communication system 5 is configured to communicate on a wireless network or a wired network.

In one embodiment, the consumer 7 is reached by suppliers 1 and/or retailers 9 directly or by media advertisement or on site display (including a small dialogue box on the corner of TV screen or special channel). In one embodiment, the consumer 7 is provide privileges and/or incentives for short or long term contracts with suppliers 1 and/or retailers 9. In one embodiment, the consumer 7 has access to several suppliers 1 and/or retailers 9 of one type utility at any time and is enabled to choose among different suppliers 1 or retailers 9 on real-time basis. In one embodiment, the consumer 7 is enabled to buy heating gas, power, water, phone, cable, internet, and sewage discharge services from different suppliers 1 and retailers 9 at different minutes and hours of the day 24/7 on a real-time basis. In one embodiment, the utility usage management system 4 facilitates contacts and billings. In one embodiment, the utility usage management system 4 is configured to pay the produced bills from the appointed consumer account automatically.

FIG. 2 is a representation of information about a particular type of utility and the available utility providers in tabular format in the first column. In one embodiment, the utility providers are shown in the top row and each utility provider is represented by a binary code. In one embodiment, each group of utility providers for a specific type of utility is separated by a blank row. In one embodiment, a utility provider code identifies the utility provider. In one embodiment, the second column lists the types of utilities available. In one embodiment, the binary code 100 is for power, 110 is for water and 010 is for phone and so forth. In one embodiment, the third and forth columns contain a binary code of 10 for a retailer and 01 for a producer. In one embodiment, columns five, six and seven represent different types of utility production and each production type is represented by a different code. In one embodiment, the code 000 is for nuclear, 010 is hydro powers, and 100 is gas. In one embodiment, column 8 represents consumption type, and column 9 represents the available quantity of a utility in real time. In one embodiment, column 10 represents the utility quality of a utility, and column 11 is a representation of real time rates. In one embodiment, all representations are in binary codes. In one embodiment, the columns x,y, . . . represent other specifications. In one embodiment, a code: 11011101100111101000101110, specifies that water supplier x who is a producer and produces from a well, has a history of some disconnections, produces home quality water, at a real time price $0.02 per liter, and has a reserve of 222 Kilo Cubic Meter at this real time. In one embodiment, such a code is produced, recorded, and stored at a utility provider supplier and then is communicated to Control & Clearing House, distribution and transmission system, and/or consumer site.

FIG. 3 is an example of a tabular representation of rules and regulations that govern consumption by a consumer on a real-time basis. In one embodiment, the regulations and restrictions are applied when inventory of one or more supplies of a particular utility is nearing critical levels, or capacity of transmission network or grid is nearing maximum levels. In one embodiment, the restrictions 1, 2, and 3 represent different restrictions for different types of utilities. In one embodiment, a restriction law for power prohibits turning on advertising neon lights during daylight hours, turning on swimming pool water heater at specific times. In one embodiment, a restriction law for water prohibits the use of lawn watering systems when evaporation is high and water reservoir levels are low. In one embodiment, a restriction law for internet usage prohibits internet gaming during office hours and emergencies due to dangers of congestion and/or dropping data transfer rates. In one embodiment, all restrictions are translated to a code format executable by a programmable device. In one embodiment, the programmable device is the utility usage management system computers at consumer site and/or the Control & Clearing House computers.

FIG. 4 is tabular example demonstrating consumer choice and preferences in one embodiment. In one embodiment, consumer preferences are given a priority number. In one embodiment, priority 1 reveals a consumer wish to use green power, spring water, gas produced by bio degrading waste, low priced long distance phone, and movie channel package for cable television (CAT). In one embodiment, all the cells of the table are translated into binary codes and conform to coding of FIG. 2 and the result can be similar to tabular format in FIG. 5 and communicated to the utility usage management system and the Control & Clearing House computers.

Figure 6:
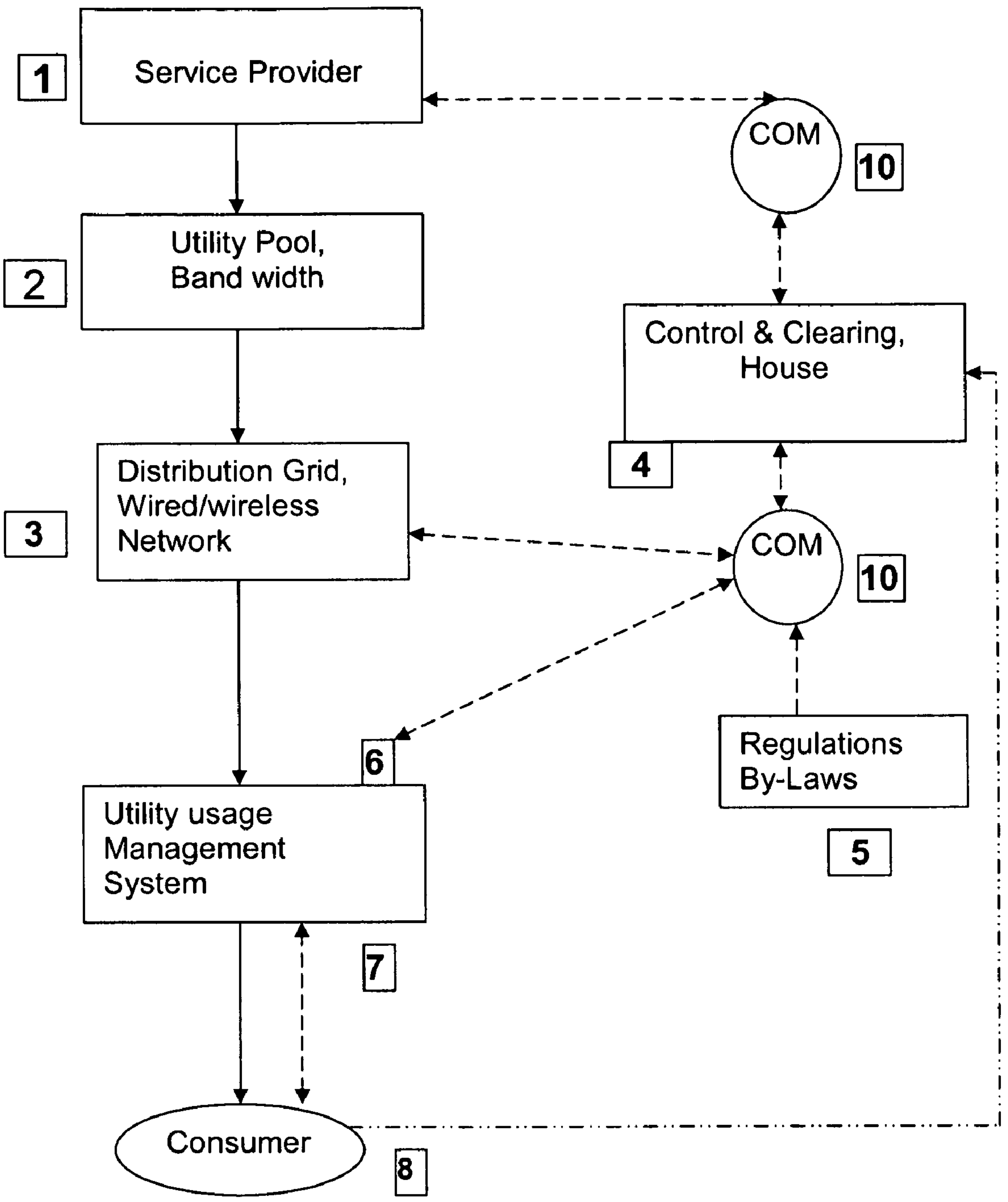
FIG. 6 is a flowchart depicting a process of pooling, distribution, and regulating, billing and clearing the accounts for transmission of a utility service.

FIG. 6 is a flowchart depicting the flow of a utility from a provider to a consumer site (left side of flowchart and shown in solid arrow), and the flow of data signals (right side of flowchart and shown in dotted lines). In one embodiment, most of dotted lines are two way data communication. In one embodiment, the Control & Clearing House 4 sends billing and account clearing information to the service provider 1, and receives utility and the provider representation from the provider 1. In one embodiment, the consumer 8 enters the consumer choice and preference data into the utility usage management system 7 located at the consumer site or the consumer provides the data to the Control & Clearing House 4 over the phone. In one embodiment, the consumer receives a display of: usage, price, and billing information at the consumer site. In one embodiment, one way communication occurs between the utility regulating authority 5 and the utility usage management system 6 located at the consumer site. In one embodiment, one way communication occurs between the utility regulating authority 5 and the Control & Clearing House 4. In one embodiment, one way communications occur because the regulations and by-laws are written, debated and passed by legislation and the regulations are recorded in the Consumer Site Usage and Management Computer System 7 and/or control center. In one embodiment, the regulations are activated by time and situational factors, for example, curtailment of usage might not be enforced unless inventory of pool goes down or transmission capacity peaks. In one embodiment, two way communications occur between the regulatory authority and the Consumer Site Usage and Management Computer System 7 to ensure consumers are complying with the regulations. In one embodiment, two way communications occur between the regulatory authority and the Control & Clearing House 4 to ensure consumers are complying with the regulations. In one embodiment, consumers voluntarily comply with some regulatory rules limiting utility consumption and consumers input consumer preference data into utility usage management system 7. In one embodiment, the direction of utility flow shown by solid arrows would be considered reversed for each provider of a utility service for sewage and other disposal.

Figure 7:
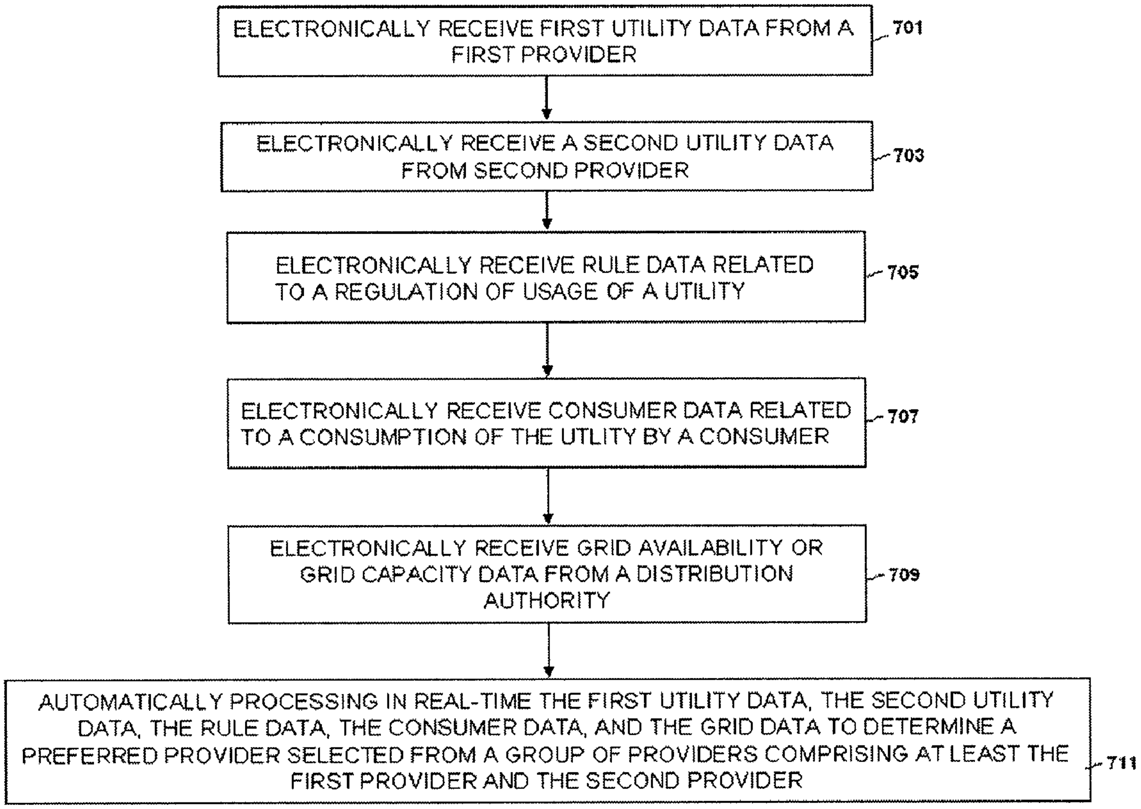
FIG. 7 is a flow chart depicting the process of determining a preferred provider.

FIG. 7 is a flow chart depicting the process of determining a preferred utility provider. In certain embodiments, the method of determining a preferred utility provider comprises electronically receiving 701 a first utility data from a first provider; electronically receiving 703 a second utility data from a second provider; electronically receiving 705 rule data related to a regulation of usage of a utility; electronically receiving 707 consumer data related to a consumption of the utility by a consumer; electronically receiving 709 grid data related to availability or grid capacity from a distribution authority; automatically processing 711 in real-time the first utility data, the second utility data, the rule data, the consumer data, and the grid data to determine a preferred provider selected from a group of providers comprising at least the first provider and the second provider.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as real time operating software modules, but may be represented in hardware or firmware.

While specific embodiments of the invention have been described and illustrated, such embodiments, or examples in descriptions, should be considered illustrative and information only and not limiting the invention as construed with the accompanying claims.

What is claimed is:

1. A method for selecting a utility provider, the method comprising:

electronically receiving first utility data from a first provider, the utility data comprising at least the price of the utility or the available quantity of the utility;

electronically receiving second utility data from a second provider, the utility data comprising at least the price of the utility or the available quantity of the utility;

electronically receiving rule data related to a regulation of usage of a utility;

electronically receiving consumer data related to a consumption of the utility by a consumer;

electronically receiving grid availability or grid capacity data from a distribution authority;

determining a priority ranking of the first utility data and the second utility data based on the consumer data;

automatically processing in real-time the first utility data, the second utility data, the rule data, the consumer data, and the grid data to determine a preferred provider selected from a group of providers comprising the first provider and the second provider, the preferred provider selection based on the first utility data, the second utility data, the rule data, the consumer data, and the grid data; and outputting the preferred provider.

2. The method of claim 1, wherein at least one of the first or the second providers is at least one of a producer or a supplier of a utility.

3. The method of claim 1, wherein at least one of the first provider or the second provider resells a utility.

4. The method of claim 1, wherein the method is performed by a programmable device that is located at a consumer site and is configured to control a utility consuming device.

5. The method of claim 4, wherein the first utility data, the second utility data, the rule data, the consumer data, and the grid data comprise a code readable by the programmable device.

6. The method of claim 5, wherein at least one of the receiving steps further comprises extracting the code from a data stream.

7. The method of claim 4, further comprises displaying on the programmable device a plurality of utility providers.

8. The method of claim 4, wherein receiving consumer data is through a user interface device.

9. The method of claim 1, wherein the method is performed by a programmable device that is located at a Control & Clearing House and is configured to communicate with a programmable device located at a consumer site.

10. The method of claim 1, wherein at least one of the receiving steps further comprises storing data in a storage medium.

11. The method of claim 1, wherein the rule data comprises utility usage regulatory data from a plurality of regulatory authorities.

12. The method of claim 1, wherein the consumer data further comprises a plurality of consumer choice parameters.

13. The method of claim 1, wherein the grid data comprises grid capacity data from a plurality of transmission systems and distribution systems or a combination thereof.

14. The method of claim 1, further comprises transmitting at least one of a utility provider's real time price for the utility to a consumer site's billing system.

15. The method of claim 1, wherein receiving grid data is by at least one of an interface device or a phone.

16. The method of claim 1, wherein each of the first utility data and the second utility data comprise prices for a plurality of usage loads.

17. The method of claim 1, wherein the consumer data further comprises different choices for different usages or loads simultaneously.

18. The method of claim 1, further comprises executing a usage code corresponding to the preferred provider.

19. The method of claim 1, wherein processing further comprises billing to the consumer, in real-time, fees owed to at least one of a provider, a distribution authority or a regulatory authority.

20. The method of claim 1, wherein the first and second utility data is received from a data provider that receives the first utility data from the first provider and the second utility data from the second provider.

21. A system for selecting a utility provider, the system comprising:

a first database configured to store a first utility data from a first provider, the utility data comprising at least one of: a utility specification for the first provider; price of utility from the first provider; and available quantity of utility from the first provider;

a second database configured to store a second utility data from a second provider, the utility data comprising at least one of: a utility specification for the second provider; price of utility from the second provider; and available quantity of utility from the second provider;

a third database configured to store a rule data related to a regulatory authority;

a fourth database configured to store consumer data related to a utility consumer;

a fifth database configured to store grid capacity or grid availability data from a distribution authority;

a server configured to process the first utility data, the second utility data, the rule data, the consumer data and the grid capacity or grid availability data to determine a preferred provider selected from a group of providers comprising at least the first provider and the second provider, the preferred provider selection based on the first utility data, the second utility data, the rule data, the consumer data, and the grid data; and wherein the server is configured to output the preferred provider.

22. The system for selecting a utility provider of claim 21, wherein the first, second, third, fourth and fifth databases are different databases.

23. The system for selecting a utility provider of claim 21, wherein the first, second, third, fourth and fifth databases are the same databases.

24. The system for selecting a utility provider of claim 21, wherein at least two of the first, second, third, fourth and fifth databases are the same databases.

* * * * *

UNITED STATES PATENT AND TRADEMARK OFFICE

CERTIFICATE OF CORRECTION

PATENT NO. : 7,353,121 B2 
APPLICATION NO. : 11/413400
DATED : April 1, 2008
INVENTOR(S) : Mohammad Reza Baraty It is certified that error appears in the above-identified patent and that said Letters Patent is hereby corrected as shown below:

On Sheet 2 of 6 (Above Cable) (Fig. 2), Line 17, delete “Swage” and please insert -- Sewage --, therefor.

On Column 3, Line 57, after “example”, please insert -- . --.

On Column 10, Line 62, delete “PTSN,” and please insert -- PSTN, --, therefor.

On Column 13, Lines 27-28, delete “information” and please insert -- informative --, therefor.

Signed and Sealed this

Twentieth Day of January, 2009

Jon W. Dudas

JON W. DUDAS
*Director of the United States Patent and Trademark Office*